(12) United States Patent
Tachibanada et al.

(10) Patent No.: US 9,574,656 B1
(45) Date of Patent: Feb. 21, 2017

(54) CONTROL APPARATUS

(71) Applicant: HONDA MOTOR CO., LTD., Tokyo (JP)

(72) Inventors: Yuya Tachibanada, Wako (JP); Yutaka Ishikawa, Wako (JP); Aaron D Hoover, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/939,022

(22) Filed: Nov. 12, 2015

(51) Int. Cl.
*F16H 61/02* (2006.01)
*F16H 3/66* (2006.01)

(52) U.S. Cl.
CPC ............ *F16H 61/0204* (2013.01); *F16H 3/66* (2013.01); *F16H 2200/0069* (2013.01); *F16H 2200/2012* (2013.01); *F16H 2200/2048* (2013.01); *F16H 2200/2066* (2013.01); *F16H 2200/2082* (2013.01)

(58) Field of Classification Search
None
See application file for complete search history.

(56) References Cited

U.S. PATENT DOCUMENTS

| 4,916,980 A * | 4/1990 | Asada ....................... F16H 3/66 475/281 |
| 7,228,215 B1 * | 6/2007 | Herter ................... F16D 48/066 192/3.57 |
| 9,140,358 B2 | 9/2015 | Tachibanada et al. |
| 2012/0295756 A1 * | 11/2012 | Lee ........................... F16H 3/66 475/289 |
| 2014/0303860 A1 | 10/2014 | Tachibanada et al. |

FOREIGN PATENT DOCUMENTS

JP 2014-202340 A 10/2014

* cited by examiner

*Primary Examiner* — Colby M Hansen
(74) *Attorney, Agent, or Firm* — Westerman, Hattori, Daniels & Adrian, LLP

(57) ABSTRACT

This invention provides a control apparatus for an automatic transmission, which includes a plurality of engaging mechanisms. The plurality of engaging mechanisms include a mechanical engaging mechanism configured to function as a brake. The mechanical engaging mechanism can be switched between a first state in which rotation of a rotational element is restricted only in one direction and a second state in which the rotation is restricted in both directions. When switching from the first state to the second state, the control apparatus executes engagement control to set a plurality of hydraulic friction engaging mechanisms in an engaging state. In the engagement control, oil pressure supply control changes depending on the vehicle speed.

6 Claims, 12 Drawing Sheets

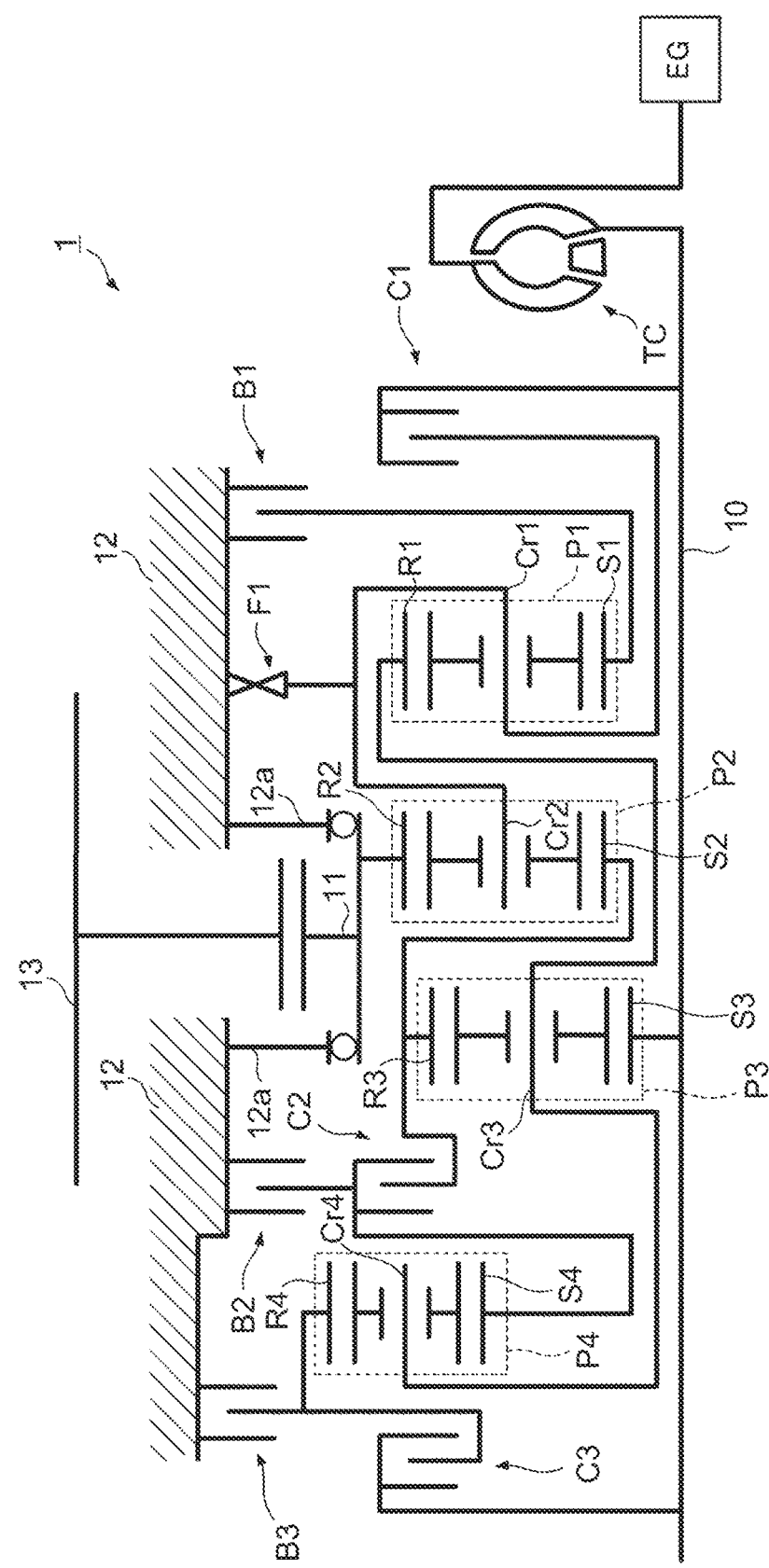

FIG. 2A

| | C1 | C2 | C3 | B1 | B2 | B3 | F1 | GEAR RATIO |
|---|---|---|---|---|---|---|---|---|
| RVS | | | ○ | | ○ | | ○ | 4.008 |
| 1st | | | | ○ | ○ | | △/○ | 5.233 |
| 2nd | | ○ | | ○ | ○ | | (△) | 3.367 |
| 3rd | | | ○ | ○ | ○ | | (△) | 2.298 |
| 4th | | ○ | ○ | ○ | | | (△) | 1.705 |
| 5th | ○ | | ○ | ○ | | | (△) | 1.363 |
| 6th | ○ | ○ | ○ | | | | (△) | 1.000 |
| 7th | ○ | | ○ | | ○ | | (△) | 0.786 |
| 8th | ○ | ○ | | | ○ | | (△) | 0.657 |
| 9th | ○ | | | | ○ | ○ | (△) | 0.584 |
| 10th | ○ | ○ | | | | ○ | (△) | 0.520 |
| P/N | | | | | | | △/○ | — |
| RPM | ○ | | ○ | | | ○ | △→○ | — |

FIG. 2B

| PLANETARY GEAR MECHANISM | GEAR RATIO |
|---|---|
| P1 | 2.681 |
| P2 | 1.914 |
| P3 | 1.614 |
| P4 | 2.734 |

FIG. 5

| STEP | ENGAGING OPERATION | | | | | | |
|---|---|---|---|---|---|---|---|
| 1 | B3 — | B2 ↓ | B1 ↓ | C3 — | C2 — | C1 — | F1 △ |
| 2 | B3 ○ | B2 — | B1 — | C3 ○ | C2 — | C1 ○ | F1 △ |
| 3 | B3 ○ | B2 — | B1 — | C3 ○ | C2 — | C1 ○ | F1 ○ |
| 4 | B3 ↓ | B2 ○ | B1 — | C3 ○ | C2 — | C1 ↓ | F1 ○ |

↓ : RELEASING
○ : ENGAGE
— : RELEASE
F1/△ : ONE-WAY ROTATION PERMISSION
F1/○ : ROTATION INHIBITION

FIG. 6
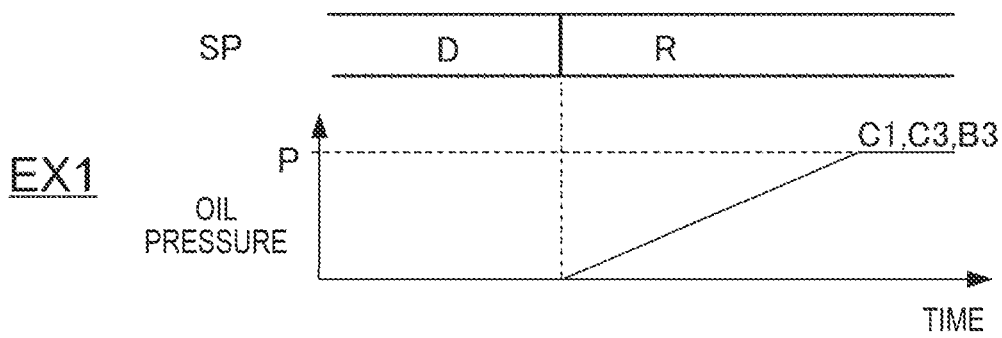
EX1
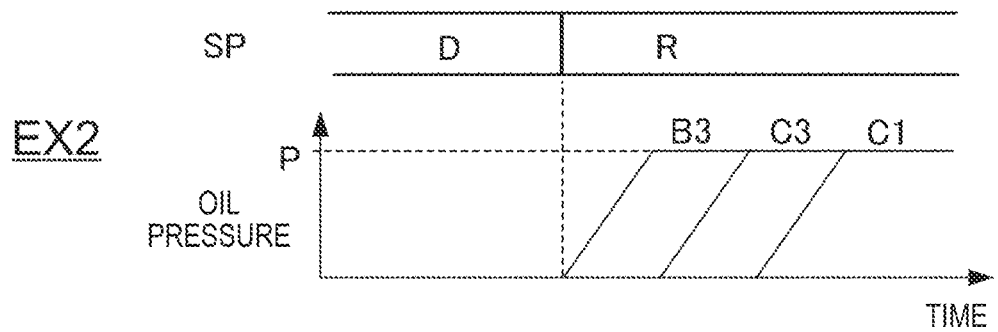
EX2
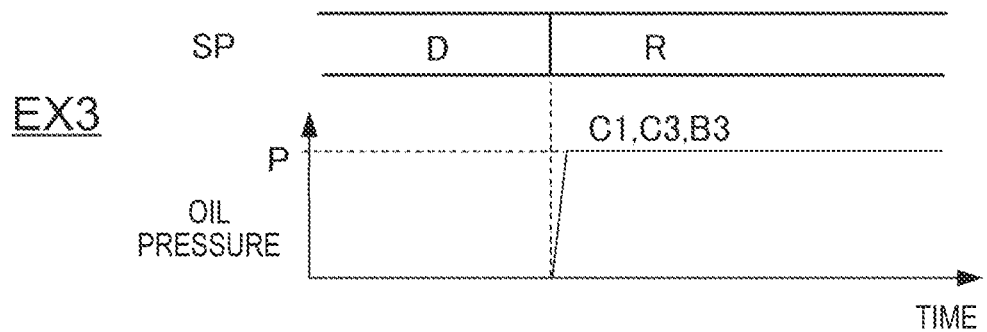
EX3

FIG. 7
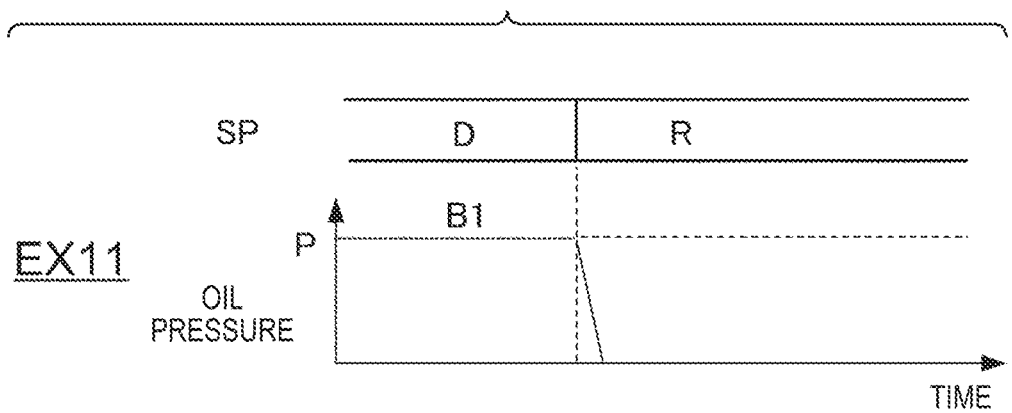
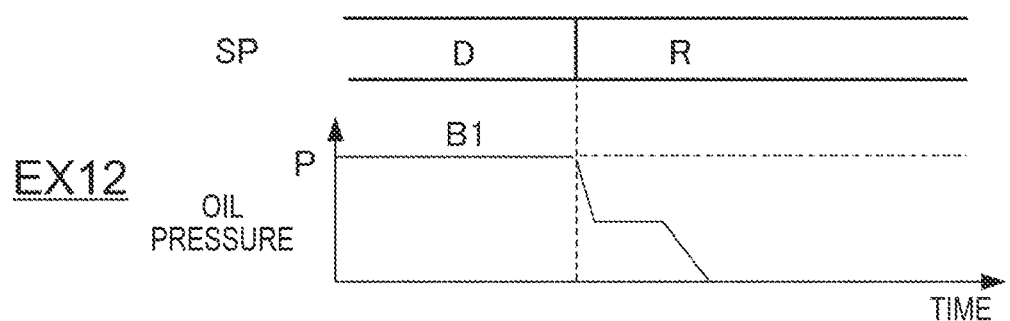
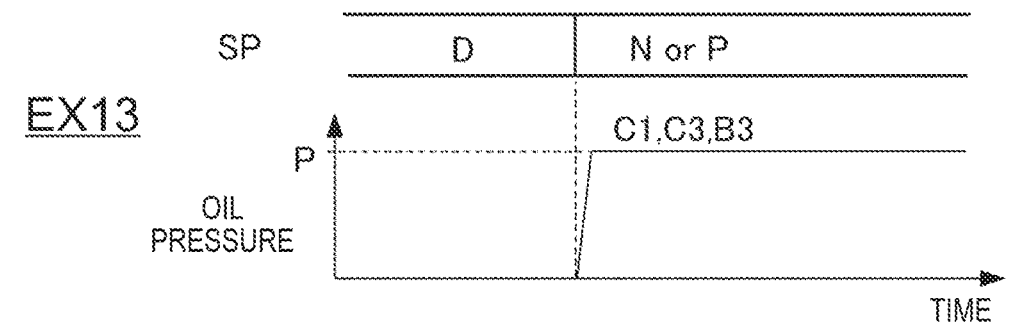

CONTROL APPARATUS

BACKGROUND OF THE INVENTION

Field of the Invention

The present invention relates to a control apparatus for an automatic transmission.

Description of the Related Art

An automatic transmission generally includes planetary gear mechanisms and engaging mechanisms such as a clutch and a brake, and implements each gear range by switching the power transmission path by the engaging mechanisms. As the engaging mechanisms, employing a mechanical engaging mechanism has been proposed in addition to a hydraulic engaging mechanism. In particular, an arrangement that uses a clutch (two-way clutch) capable of switching to a state to do two-way rotation restriction as a brake has been proposed (for example, Japanese Patent Laid-Open No. 2014-202340).

When the two-way clutch is used as a brake, a rotational element connected to the two-way clutch can be switched between a state in which rotation is restricted only in one direction (rotation in the reverse direction is permitted) and a state in which rotation is restricted in both directions. When switched to the state in which rotation is restricted in both directions, the rotational element connected to the two-way clutch is fixed to the casing. For this reason, if switching is done during rotation of the rotational element, unusual noise or vibration occurs, and the two-way clutch breaks. To prevent this, switching may be performed via an engaging combination that brings the rotational element to a standstill.

However, if establishment of the engaging combination that brings the rotational element to a standstill takes time, switching of the gear range may take time. On the other hand, if the vehicle is at rest or has a very low speed, the rotation speed of each rotational element of the planetary gear mechanisms is low, and unusual noise or vibration is small.

SUMMARY OF THE INVENTION

It is an object of the present invention to suppress unusual noise or vibration when switching a mechanical engaging mechanism, and if unusual noise or vibration is expected to be small, shorten the switching time of the mechanical engaging mechanism.

According to an aspect of the present invention, there is provided a control apparatus for an automatic transmission, the automatic transmission including: an input shaft to which a driving force is input; an output member; a plurality of planetary gear mechanisms configured to transmit the driving force input to the input shaft to the output member; and a plurality of engaging mechanisms capable of establishing a plurality of gear ranges by switching a transmission path of the driving force in the plurality of planetary gear mechanisms, wherein the plurality of engaging mechanisms include: a mechanical engaging mechanism configured to function as a brake; and a plurality of hydraulic friction engaging mechanisms, the mechanical engaging mechanism can be switched between a first state in which rotation of a predetermined rotational element, out of a plurality of rotational elements included in the plurality of planetary gear mechanisms, is restricted only in one direction and a second state in which the rotation of the predetermined rotational element is restricted in both directions, the control apparatus comprising: a detection unit configured to detect a vehicle speed; and a control unit configured to control the plurality of engaging mechanisms, wherein the control unit executes switching control to switch the mechanical engaging mechanism from the first state to the second state when a predetermined switching condition is met, in the switching control, after engagement control for setting a plurality of hydraulic friction engaging mechanisms selected from the plurality of hydraulic friction engaging mechanisms in an engaging state, the mechanical engaging mechanism is switched from the first state to the second state, and in the engagement control, if a speed detection result is not more than a threshold, oil pressure supply control for completing the engagement in a time shorter that in a case in which the speed detection result exceeds the threshold is performed.

Further features of the present invention will become apparent from the following description of exemplary embodiments (with reference to the attached drawings).

BRIEF DESCRIPTION OF THE DRAWINGS

FIG. 1 is a skeleton diagram of an automatic transmission according to an embodiment of the present invention;

FIG. 2A is a view showing an example of the engagement table of engaging mechanisms;

FIG. 2B is a view showing the gear ratios of planetary gear mechanisms;

FIG. 5 is a view for explaining the outline of processing performed when the reverse range is selected;

FIG. 6 shows timing charts illustrating examples of oil pressure supply control;

FIG. 7 shows timing charts illustrating examples of oil pressure supply control;

DESCRIPTION OF THE EMBODIMENTS

Figure 3:
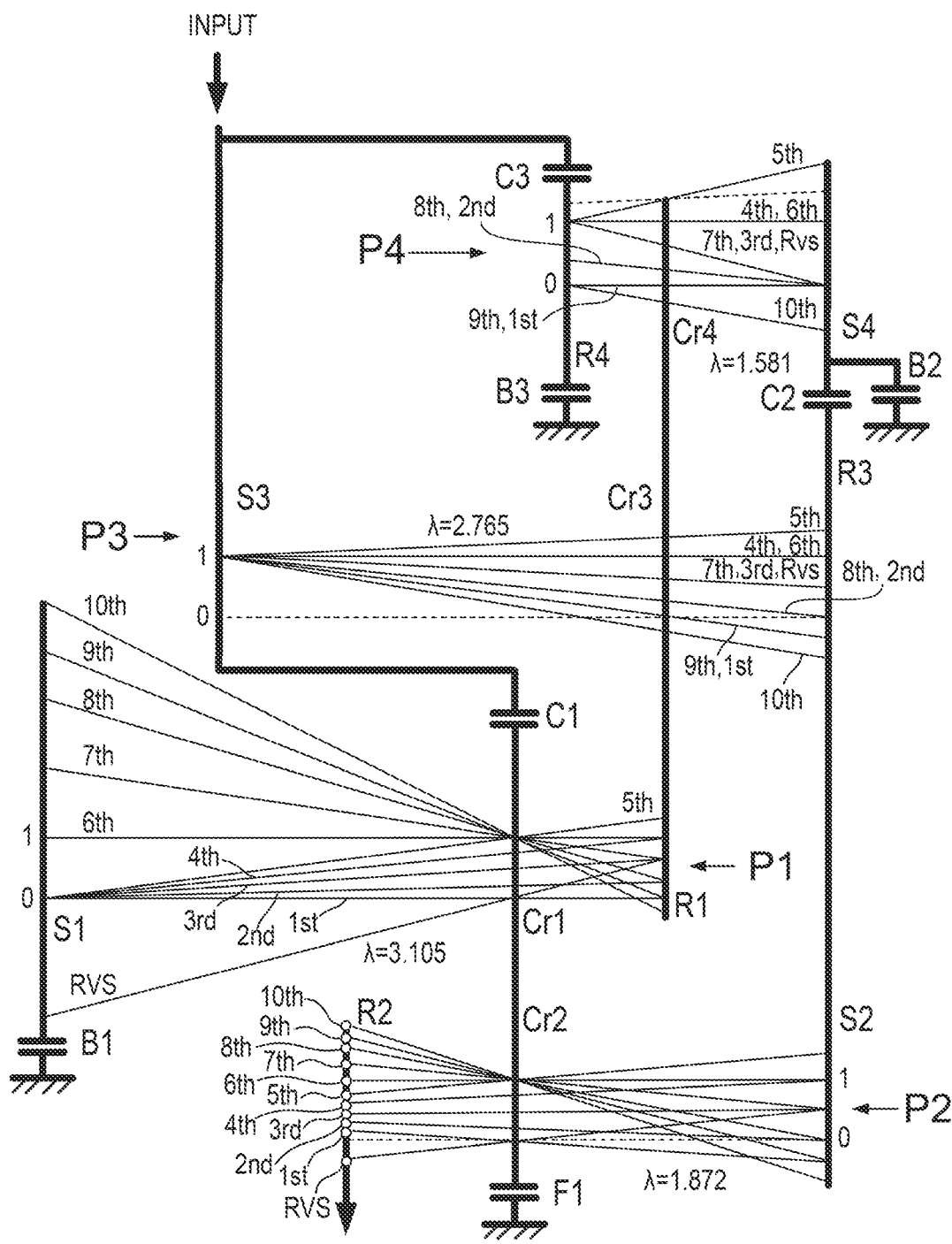
FIG. 3 is a velocity diagram of the automatic transmission shown in FIG. 1.

FIG. 1 is a skeleton diagram of an automatic transmission 1 according to an embodiment of the present invention. Referring to FIG. 1, the automatic transmission 1 includes an input shaft 10 rotatably axially supported in a casing 12 that forms a transmission case, an output member 11 rotatably supported by support members 12a supported in the casing 12 so as to be coaxial with respect to the input shaft 10, and an output shaft (counter shaft) 13.

A driving force from an internal combustion engine EG (to be sometimes simply referred to as EG) is input to the input shaft 10, and the input shaft 10 is rotated by the driving force. A starting device is provided between the input shaft 10 and the internal combustion engine EG. Examples of the starting device are a clutch type starting device (single disc clutch, multiple disc clutch, or the like) and a hydraulic coupling type starting device (torque converter or the like). In this embodiment, a torque converter TC is provided.

Hence, the driving force of the internal combustion engine EG is input to the input shaft 10 through the torque converter TC.

The output member 11 includes a gear concentric to the input shaft 10. The output shaft 13 includes a gear that engages with the gear. The rotation of the input shaft 10 changes its speed through transmission mechanisms to be described below and is then transmitted to the output shaft 13. The rotation (driving force) of the output shaft 13 is transmitted to driving wheels through, for example, differential gears (not shown).

As the transmission mechanisms, the automatic transmission 1 includes planetary gear mechanisms P1 to P4 and engaging mechanisms C1 to C3, B1 to B3, and F1. In this embodiment, the planetary gear mechanisms P1 to P4 are single pinion type planetary gear mechanisms. The planetary gear mechanisms P1 to P4 transmit the driving force from the input shaft 10 to the output member 11. The planetary gear mechanisms P1 to P4 can form a plurality of driving force transmission paths. The engaging mechanisms C1 to C3, B1 to B3, and F1 switch the driving force transmission paths of the planetary gear mechanisms P1 to P4, thereby establishing a plurality of gear ranges.

The planetary gear mechanisms P1 to P4 include sun gears S1 to S4, ring gears R1 to R4, and carriers Cr1 to Cr4 each supporting a pinion gear, respectively, as rotational elements (12 in total), and are disposed to be coaxial with respect to the input shaft 10.

When ordered in accordance with the arrangement order at intervals corresponding to gear ratios shown in the velocity diagram of FIG. 3 (to be described later), the sun gear S1, the carrier Cr1, and the ring gear R1 of the planetary gear mechanism P1 can be referred to as a first rotational element, a second rotational element, and a third rotational element in this order.

Similarly, the sun gear S2, the carrier Cr2, and the ring gear R2 of the planetary gear mechanism P2 can be referred to as a fourth rotational element, a fifth rotational element, and a sixth rotational element in this order.

Similarly, the sun gear S3, the carrier Cr3, and the ring gear R3 of the planetary gear mechanism P3 can be referred to as a seventh rotational element, an eighth rotational element, and a ninth rotational element in this order.

Similarly, the sun gear S4, the carrier Cr4, and the ring gear R4 of the planetary gear mechanism P4 can be referred to as a 10th rotational element, a 11th rotational element, and a 12th rotational element in this order.

Each of the engaging mechanisms C1 to C3, B1 to B3, and F1 functions as a clutch or a brake. A clutch connects/disconnects the rotational elements provided in the automatic transmission 1. A brake connects/disconnects the rotational elements provided in the automatic transmission 1 to/from the casing 12. The rotational elements provided in the automatic transmission 1 include the input shaft 10 and the sun gears, ring gears, and carriers of the planetary gear mechanisms P1 to P4.

In this embodiment, the engaging mechanisms C1 to C3 are clutches, and the engaging mechanisms B1 to B3 and F1 are brakes. Hence, the engaging mechanisms C1 to C3 are sometimes called the clutches C1 to C3, and the engaging mechanisms B1 to B3 and F1 are sometimes called the brakes B1 to B3 and F1. When the engaging mechanisms C1 to C3 and B1 to B3 are switched between an engaging state (fastening state) and a release state (disengaging state), and the state of the engaging mechanism F1 is switched, the driving force transmission path from the input shaft 10 to the output member 11 is switched, and the plurality of gear ranges are implemented.

In this embodiment, all the engaging mechanisms C1 to C3 and B1 to B3 are assumed to be hydraulic friction engaging mechanisms. Examples of the hydraulic friction engaging mechanism are dry and wet single disc clutches and dry and wet multiple disc clutches.

The engaging mechanism F1 is provided between the casing 12 and predetermined rotational elements (here, the carriers Cr1 and Cr2 connected to each other). The engaging mechanism F1 can be switched between a one-way rotation permission state (to be sometimes referred to as OWC) in which the rotation of the predetermined rotational elements (carriers Cr1 and Cr2) is restricted only in one direction, and rotation in the reverse direction is permitted and a rotation inhibition state (to be sometimes referred to as TWC) in which rotation is restricted in both directions.

In the one-way rotation permission state, the same function as a so-called one-way clutch is implemented. In this state, the rotational elements transmit the driving force in one rotation direction but slip in the reverse direction. In this embodiment, the engaging mechanism F1 functions as a brake. For this reason, if the engaging mechanism F1 is in the one-way rotation permission state, the predetermined rotational elements (carriers Cr1 and Cr2) are permitted to rotate only in one direction. In the rotation inhibition state, the rotational elements transmit the driving force in both rotation directions. In this embodiment, the engaging mechanism F1 functions as a brake. For this reason, if the engaging mechanism F1 is in the rotation inhibition state, the predetermined rotational elements (carriers Cr1 and Cr2) are inhibited from rotating in both directions.

As the engaging mechanism F1, for example, a known two-way clutch can be employed. Some known two-way clutches can be switched between the one-way rotation permission state, the rotation inhibition state, and a two-way rotation permission state by driving control of a corresponding hydraulic actuator or electromagnetic actuator. Some known two-way clutches can further switch the one-way rotation permission state between a forward rotation permission state and a reverse rotation permission state. In this embodiment, switching between the one-way rotation permission state and the rotation inhibition state suffices, and using only the permission state in one rotation direction as the one-way rotation permission state suffices. However, a two-way clutch capable of selecting another state such as the two-way rotation permission state may be employed.

The connection relationship between the components will be described next with reference to FIG. 1.

The sun gear S3 of the planetary gear mechanism P3 is connected to the input shaft 10. The ring gear R3 is connected to the sun gear S2 of the planetary gear mechanism P2. The carrier Cr3 is connected to the ring gear R1 of the planetary gear mechanism P1 and the carrier Cr4 of the planetary gear mechanism P4. The carrier Cr2 of the planetary gear mechanism P2 is connected to the carrier Cr1 of the planetary gear mechanism P1. The ring gear R2 is connected to the output member 11. Hence, the planetary gear mechanism P2 transmits the driving force to the output shaft 13.

The clutch C1 connects the input shaft 10 to the carrier Cr1 of the planetary gear mechanism P1 and the carrier Cr2 connected to the carrier Cr1 in the engaging state, and disconnects them in the release state. The clutch C2 connects the ring gear R3 of the planetary gear mechanism P3 to the sun gear S4 of the planetary gear mechanism P4 in the engaging state, and disconnects them in the release state. The clutch C3 connects the input shaft 10 to the ring gear R4 of the planetary gear mechanism P4 in the engaging state, and disconnects them in the release state.

The brake B1 connects the casing 12 to the sun gear S1 of the planetary gear mechanism P1 in the engaging state, and disconnects them in the release state. The brake B2 connects the casing 12 to the sun gear S4 of the planetary gear mechanism P4 in the engaging state, and disconnects them in the release state. The brake B3 connects the casing 12 to the ring gear R4 of the planetary gear mechanism P4 in the engaging state, and disconnects them in the release state.

As already described, the brake F1 restricts the rotation of the carrier Cr2 of the planetary gear mechanism P2 (and the carrier Cr1 connected to the carrier Cr2) only in one direction in the one-way rotation permission state, and fixes the carrier Cr2 of the planetary gear mechanism P2 (and the carrier Cr1 connected to the carrier Cr2) to the casing 12 in the rotation inhibition state.

FIG. 2A is an engagement table (fastening table) showing the engaging combination of the engaging mechanisms provided in the automatic transmission 1. FIG. 2B shows the gear ratios of the planetary gear mechanisms provided in the automatic transmission 1. FIG. 3 is a velocity diagram of the automatic transmission 1. "Gear ratio" in FIG. 2A indicates the gear ratio between the input shaft 10 and the output member 11.

In this embodiment, 10 forward ranges (1st to 10th) and one reverse range (RVS) can be established. "P/N" represents non-running ranges; "P", a parking range; and "N", a neutral range. "RPM" represents an engaging combination in RVS preparation processing (to be described later). In this processing, the brake F1 is switched from the one-way rotation permission state to the rotation inhibition state.

In the example of the engaging table shown in FIG. 2A, "◯" indicates the engaging state, and no mark indicates the release state. Note that there are included engaging mechanisms that are set in the engaging state for smooth change to adjacent gear ranges, although the engagement is not essential to establish the gear ranges. For example, in the first range (1st), engagement of the brake B2 is not essential. However, when changing to the reverse range (RVS) or second range (2nd), the brake B2 is set in the engaging state for the purpose of decreasing the engaging mechanisms to switch the engaging state. Similarly, in the fifth range (5th), engagement of the clutch C3 is not essential. However, when changing to the fourth range (4th) or sixth range (6th), the clutch C3 is set in the engaging state for the purpose of decreasing the engaging mechanisms to switch the engaging state.

As for the brake F1, "◯" indicates the rotation inhibition state, and "Δ" indicates the one-way rotation permission state. In the first range (1st), the brake F1 can be set in either the rotation inhibition state or the one-way rotation permission state. In the rotation inhibition state, the engine brake is enabled. In the one-way rotation permission state, the engine brake does not take hold. An algorithm to set the brake F1 in one of the states in the first range (1st) can appropriately be designed. For example, the state before a change to the first range (1st) is inherited. More specifically, when changed from the reverse range (RVS) to the first range (1st), the brake F1 remains in the rotation inhibition state in the first range (1st). However, if, for example, the vehicle speed exceeds a predetermined speed, the brake F1 may be switched to the one-way rotation permission state. Similarly, when changed from other forward ranges (2nd to 10th) to the first range (1st), the brake F1 remains in the one-way rotation permission state in the first range (1st).

In the non-running ranges (P/N) as well, the state of the brake F1 can be either the rotation inhibition state or the one-way rotation permission state. Hence, the state before a change to the non-running ranges (P/N) may be inherited, as in the first range (1st).

In the second range (2nd) to the 10th range (10th), the brake F1 is set in the one-way rotation permission state, but slips because of the structure of the automatic transmission 1. For this reason, the state of the brake F1 is indicated by "(Δ)". If the brake F1 is a mechanical engaging mechanism capable of selecting the above-described two-way rotation permission state, it can be set in the two-way rotation permission state in the second range (2nd) to the 10th range (10th).

Note that in this embodiment, in the second range (2nd) to the 10th range (10th), the one-way rotation permission state is selected as the state of the brake F1. However, depending on the structure of the automatic transmission 1, an arrangement for selecting the rotation inhibition state can also be employed.

The velocity diagram of FIG. 3 shows the rotation speed ratio of each element to the input to the input shaft 10 in each gear range. The ordinate represents the speed ratio. "1" indicates the same rotation speed as the input shaft 10, and "0" indicates a stop state. The abscissa is based on the gear ratio between the rotational elements of the planetary gear mechanisms P1 to P4. λ is the gear ratio between a carrier Cr and a sun gear S. Note that in FIG. 3, elements corresponding to the output shaft 13 are not illustrated.

<Control Apparatus>

Figure 4A:
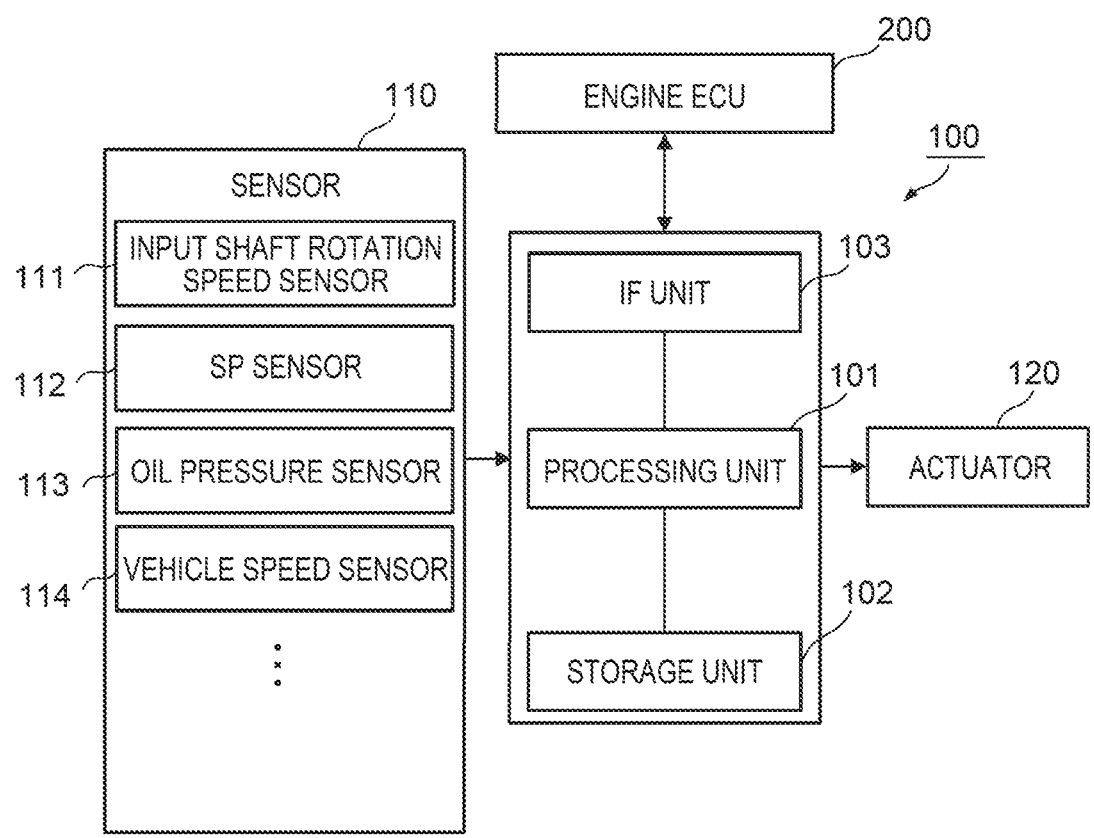
FIG. 4A is a block diagram showing an example of the control apparatus of the automatic transmission shown in FIG. 1.

FIG. 4A is a block diagram of a control apparatus 100 of the automatic transmission 1. The control apparatus 100 can control not only the automatic transmission 1 but also the internal combustion engine EG and the torque converter TC. In this embodiment, the internal combustion engine EG is assumed to be controlled by an engine ECU 200 provided independently of the control apparatus 100. The control apparatus 100 can receive various kinds of information of the internal combustion engine EG and the vehicle from the engine ECU 200. The control apparatus 100 can also transmit the information of the automatic transmission 1 to the engine ECU 200.

The control apparatus 100 includes a processing unit 101 such as a CPU, a storage unit 102 such as a RAM and ROM, and an IF unit 103 that interfaces the processing unit 101 and an external device or the engine ECU. The IF unit 103 is formed from, for example, a communication interface, an input/output interface, or the like.

The processing unit 101 executes a program stored in the storage unit 102 and controls various kinds of actuators 120 based on the detection results of various kinds of sensors 110.

The various kinds of sensors 110 include various kinds of sensors provided in the automatic transmission 1. FIG. 4A illustrates the following sensors.

An input shaft rotation speed sensor 111 detects the rotation speed of the input shaft 10. An SP sensor (shift position sensor) 112 detects a shift position selected by the driver. In this embodiment, four types of shift positions, that is, P range (parking range), D range (forward range), N range (neutral range), and R range (reverse range) are assumed. If the D range is selected, the processing unit 101 selects one of the first range (1st) to the 10th range (10th) in accordance with a gear change map stored in the storage unit 102 and changes the gear. If the R range is selected, the processing unit 101 selects the reverse range.

An oil pressure sensor 113 includes a sensor that detects the oil pressure of hydraulic oil in each of the engaging mechanisms C1 to C3 and B1 to B3. A vehicle speed sensor 114 detects the traveling speed of the vehicle on which the automatic transmission 1 is mounted.

The various kinds of actuators 120 include various kinds of actuators provided in the automatic transmission 1. For example, the actuators 120 include an electromagnetic actuator such as an electromagnetic solenoid that switches the operation state of each of the engaging mechanisms C1 to C3, B1 to B3, and F1. The processing unit 101 thus controls the various kinds of actuators 120.

Figure 4B:
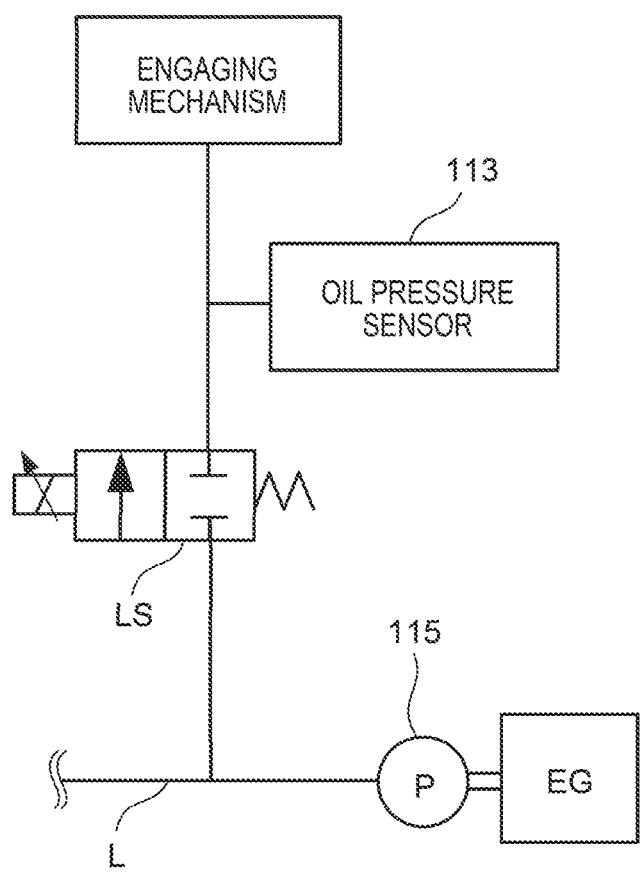
FIG. 4B is a view showing an example of the arrangement of an oil pressure sensor.

FIG. 4B shows an example of the arrangement of the oil pressure sensor 113. The oil pressure sensor 113 can be provided for, for example, each of the engaging mechanisms C1 to C3 and B1 to B3. The oil pressure of hydraulic oil in each engaging mechanism can thus be detected. Note that the oil pressure sensor 113 need not always be provided for each engaging mechanism.

A solenoid valve LS for supplying hydraulic oil is assigned to each engaging mechanism. A supply line L of hydraulic oil is opened or closed by the solenoid valve LS, thereby switching the engaging and release states of each engaging mechanism. The oil pressure sensor 113 is provided so as to receive the hydraulic oil supplied from the solenoid valve LS to the engaging mechanism. The detection result of the oil pressure sensor 113 represents the oil pressure of the hydraulic oil supplied to the engaging mechanism. An oil pump 115 driven by the internal combustion engine EG forces the hydraulic oil into the supply line L.

<Switching Control of Brake F1>

In this embodiment, the brake F1 is in the rotation inhibition state in the reverse range. When switching from the forward range or non-running range to the reverse range, the brake F1 can be switched from the one-way rotation permission state to the rotation inhibition state. At this time, to reduce unusual noise or vibration, the difference between the rotation speed of the brake F1 on the side of the casing 12 and that on the side of the carrier Cr2 is preferably 0. In other words, the rotation speed of the carrier Cr2 is preferably 0.

To do this, a combination of engaging mechanisms that changes the rotation speed of the carrier Cr2 to 0 intervenes. In this embodiment, there is no sensor for directly measuring the rotation speed of the carrier Cr2. For this reason, the carrier Cr2 and the input shaft 10 are connected, and it is confirmed from the detection result of the input shaft rotation speed sensor 111 or the like that the rotation speed of the carrier Cr2 is 0. After that, the brake F1 is switched to the rotation inhibition state.

FIG. 5 shows the engaging combination of engaging mechanisms when switching the gear range from the first forward range to the reverse range. When the gear range is the first forward range, the brakes B1 and B2 are in the engaging state, as shown in FIG. 2A. The brake F1 is assumed to be in the one-way rotation permission state.

First, as indicated by step 1 in FIG. 5, the brakes B1 and B2 are controlled to the release state. When release of the brakes B1 and B2 starts, the process advances to step 2.

In step 2, the clutches C1 and C3 and the brake B3 engage. The ring gear R2 and the output shaft 13 are rotatable, and the driving wheels can freely rotate. It is therefore possible to avoid an unexpected behavior of the vehicle.

As is apparent from the velocity diagram of FIG. 3, when the clutch C3 and the brake B3 engage, the input shaft 10 is fixed to the casing 12. When the clutch C1 engages, the carrier Cr2 is connected to the input shaft 10.

Note that steps 1 and 2 can be performed in parallel. More specifically, control to engage the clutches C1 and C3 and the brake B3 is performed while performing control to release the brakes B1 and B2. This can improve responsibility when switching the gear range to the reverse range.

If predetermined conditions are met, the process advances to step 3. The predetermined conditions are conditions to confirm that the rotation speed of the carrier Cr2 is 0. Basically, the conditions are completion of engagement of the clutch C1 and detection result of input shaft rotation speed sensor 111<predetermined value (for example, a value that can be regarded as 0). As for completion of engagement of the clutch C1, for example, when the detection result of the oil pressure sensor 113 of the clutch C1 indicates a predetermined oil pressure or when the control amount of the solenoid valve LS for the clutch C1 reaches a predetermined value, it can be determined that engagement is completed. The same determination method can be employed even for completion of engagement of other engaging mechanisms.

In step 3, the brake F1 is switched from the one-way rotation permission state to the rotation inhibition state. Since the difference between the rotation speed of the brake F1 on the side of the casing 12 and that on the side of the carrier Cr2 is 0, occurrence of unusual noise or vibration can be avoided. When switching of the brake F1 is completed, the process advances to step 4. In step 4, the clutch C1 and the brake B3 are released, and the brake B2 engages. The combination for the reverse range thus holds (FIG. 2A).

In some cases, the processing in steps 1 to 3 is called RVS preparation processing, and the processing of step 4 is called RVS in-gear processing. In terms of control, when an RVS preparation mode is set as the control state of the gear range, RVS preparation processing is performed. In addition, when step 3 is completed, an RVS in-gear mode is set as the control state of the gear range. When the RVS in-gear mode is set, RVS in-gear processing is performed. Such mode setting is managed by, for example, providing a mode information storage area in the storage unit 102. An example of processing executed by the processing unit 101 concerning the control contents shown in FIG. 5 will be described later with reference to FIGS. 8 and 9.

<Oil Pressure Supply Control>

In RVS preparation processing, the plurality of engaging mechanisms C1, C3, and B3 engage. They are hydraulic engaging mechanisms, and the time needed to complete engagement changes depending on the supply amount of the hydraulic oil. In addition, the total time needed to complete engagement of the three engaging mechanisms changes depending on the supply timings of the hydraulic oil to the engaging mechanisms C1, C3, and B3.

If the hydraulic oil supply amount per unit time is increased, the time needed to complete engagement becomes short. However, unusual noise or vibration readily occurs accordingly. If the hydraulic oil supply amount per unit time is decreased, the time needed to complete engagement is relatively prolonged. However, unusual noise or vibration becomes small.

If the engaging mechanisms C1, C3, and B3 simultaneously engage, the time needed to complete engagement becomes short. However, unusual noise or vibration readily occurs accordingly. If the engaging mechanisms C1, C3, and B3 engage with time lags, the time needed to complete engagement is relatively prolonged. However, unusual noise or vibration becomes small.

The RVS preparation processing aims at suppressing unusual noise or vibration. However, if the RVS preparation processing takes time, a time lag is generated from R range selection by the driver to establishment of the reverse range, and smooth start may be impossible. Hence, the RVS preparation processing is preferably ended in a short time.

In this embodiment, oil pressure supply control is changed in accordance with the vehicle speed when executing RVS preparation processing. In a stop state or at a very low speed, all rotational elements in the automatic transmission 1 stand still or have small inertia. In this case, even if the engaging mechanisms C1, C3, and B3 engage in a short time, unusual noise or vibration is assumed to be small. Hence, in a stop state or at a very low speed, control to increase the hydraulic oil supply amount per unit time is performed (called oil pressure supply control B).

On the other hand, if the vehicle has a predetermined speed or more, a rotating rotational element exists in the automatic transmission 1. In this case, giving priority to suppressing unusual noise or vibration, control to decrease the hydraulic oil supply amount per unit time is performed (called oil pressure supply control A).

This makes it possible to suppress unusual noise or vibration when switching the mechanical engaging mechanism F1 and also shorten the switching time of the mechanical engaging mechanism F1 if unusual noise or vibration is expected to be small. In general, switching from the D range to the R range often occurs probably in a stop state or at a very low speed. Hence, the oil pressure supply control B is employed, thereby implementing smooth start (reverse travel) while making unusual noise or vibration small.

Comparative examples of the oil pressure supply controls A and B will be described with reference to FIG. 6. FIG. 6 shows timing charts illustrating changes in oil pressures supplied to the engaging mechanisms C1, C3, and B3 in RVS preparation processing. "P" indicates an oil pressure when engagement is completed.

EX1 in FIG. 6 shows an example of the oil pressure supply control A. When a shift position SP is switched from the D range to the R range, RVS preparation processing starts, and the hydraulic oil is supplied to the engaging mechanisms C1, C3, and B3. EX1 represents an example in which the engaging mechanisms C1, C3, and B3 simultaneously engage. The flow rate for each of the engaging mechanisms C1, C3, and B3 is increased in multiple steps by flow rate control of a corresponding solenoid valve LS. When an oil pressure P is reached, the engaging mechanism is set in the engaging state. When the flow rate is increased in multiple steps, the time until engagement is prolonged, but unusual noise or vibration becomes small.

EX2 in FIG. 6 shows another example of the oil pressure supply control A. EX2 may be employed in place of EX1. When the shift position SP is switched from the D range to the R range, RVS preparation processing starts, and the hydraulic oil is supplied to the engaging mechanisms C1, C3, and B3 with time lags. The engaging mechanisms B3 and C3 are engaged preferentially, and the engaging mechanism C1 is then engaged. This means that after the input shaft 10 is fixed, the engaging mechanism C1 engages to reduce the rotation speed of the carrier Cr2 to 0. When the hydraulic oil is supplied to the engaging mechanisms C1, C3, and B3 with time lags, the time until engagement of all engaging mechanisms is completed is prolonged, but unusual noise or vibration becomes small.

EX3 in FIG. 6 shows an example of the oil pressure supply control B. When the shift position SP is switched from the D range to the R range, RVS preparation processing starts, and the hydraulic oil is supplied to the engaging mechanisms C1, C3, and B3. In the oil pressure supply control B, engagement is completed in a time shorter than in the oil pressure supply control A. In EX3, the engaging mechanisms C1, C3, and B3 simultaneously engage, and the hydraulic oil is supplied such that it can reach the oil pressure P in a stroke (or in several steps) under the flow rate control of the corresponding solenoid valves LS. In a case in which the oil pressure supply control B is performed, all rotational elements in the automatic transmission 1 stand still or have small inertia. Hence, even if the engaging mechanisms abruptly engage, unusual noise or vibration is small, and the engagement can be completed in a short time.

Note that in execution of the oil pressure supply control B, when switching the mechanical engaging mechanism F1, it is particularly important that the carrier Cr2 stands still. Hence, to maintain the standstill state of the carrier Cr2, release of the engaging mechanism B1 in step 1 of FIG. 5 may be delayed as compared to a case in which the oil pressure supply control A is executed. EX11 and EX12 of FIG. 7 are timing charts illustrating changes in oil pressures supplied to the engaging mechanism B1 in RVS preparation processing.

EX11 shows a case of the oil pressure supply control A, and EX12 shows a case of the oil pressure supply control B. When the shift position SP is switched from the D range to the R range, RVS preparation processing starts. Supply of the hydraulic oil to the engaging mechanism B1 is stopped, and the oil pressure of the engaging mechanism B1 lowers. In a case in which the oil pressure supply control B is performed, however, the oil pressure of the engaging mechanism B1 is maintained to some extent to set the engaging mechanism B1 in a half-engaging state. When the engaging mechanism B1 in the half-engaging state, the sun gear S1 hardly rotates, and the start of rotation of the carrier Cr1 and the ring gear R1 in a standstill state is suppressed. Since the carrier Cr2 is connected to the carrier Cr1, the start of rotation of the carrier Cr2 is also suppressed. Hence, the standstill state is maintained. When a predetermined time has elapsed, or the oil pressure of the engaging mechanism C1 reaches the oil pressure P, the engaging mechanism B1 is released.

<Another Example of RVS Preparation Processing>

To end the RVS preparation processing in a short time, one of the three engaging mechanisms C1, C3, and B3 (for example, B3) may engage or half-engage when the D range is being selected. In the arrangement of the automatic transmission 1 according to this embodiment, when the brake F1 is set in the one-way rotation permission state, and the engaging combination for the first range (1st) shown in FIG. 2A is set, the engine brake is switched between the enabled state and the disabled state by engaging/releasing the engaging mechanism B3. Hence, even if pre-engagement of the engaging mechanism B3 is started, running is not hindered. Hence, for example, in a stop state or at a low speed, the engaging mechanism B3 may engage or half-engage to prepare for switching to the R range.

<Switching Control to Reverse Range>

An example of processing executed by the processing unit 101 concerning the control contents shown in FIG. 5 will be described with reference to FIGS. 8 and 9.

Figure 8:
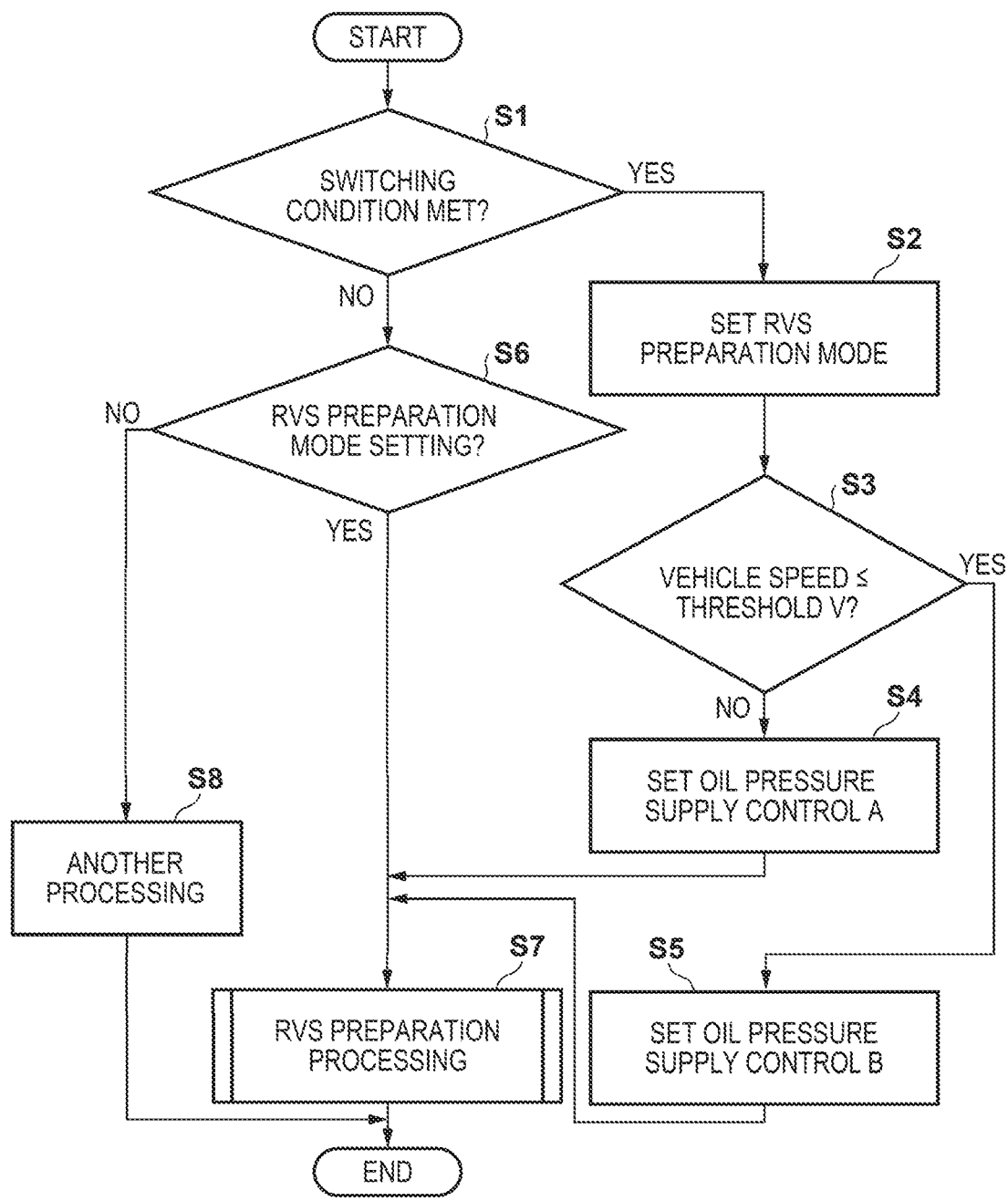
FIG. 8 is a flowchart showing an example of processing of the control apparatus shown in FIG. 4A.

FIG. 8 will be referred to first. In step S1, it is determined whether a condition to switch the brake F1 from the one-way rotation permission state to the rotation inhibition state is met. In this embodiment, if the brake F1 is in the one-way rotation permission state, and the SP sensor 112 detects that the driver has switched the shift range from the D range (for example, the first range) to the reverse range, it is determined that the condition is met. If YES in step S1, the process advances to step S2. Otherwise, the process advances to step S6.

In step S2, the RVS preparation mode is set as the control mode. After that, the process advances to step S3. In step S3, it is determined whether the speed detection result of the vehicle speed sensor 114 is equal to or less than a threshold V. The threshold V can be a value corresponding to a stop (for example, 0 km/h). If the speed detection result is equal to or less than the threshold V, the process advances to step S5. If the speed detection result exceeds the threshold V, the process advances to step S4. In step S4, the above-described oil pressure supply control A is set as oil pressure control in the RVS preparation processing to be started. In step S5, the oil pressure supply control B is set.

Note that depending on the detection accuracy of the vehicle speed sensor 114, the vehicle may actually be running at a very low speed even if 0 km/h is detected. However, as already described above, at a very low speed, all rotational elements in the automatic transmission 1 have small inertia. Hence, the oil pressure supply control B can be employed.

In step S6, it is determined whether the RVS preparation mode is set. If YES in step S6, the process advances to step S7. Otherwise, the process advances to step S8. In step S7, RVS preparation processing is performed. Details will be described later. In step S8, another processing is performed, and the processing of one unit ends.

Figure 9:
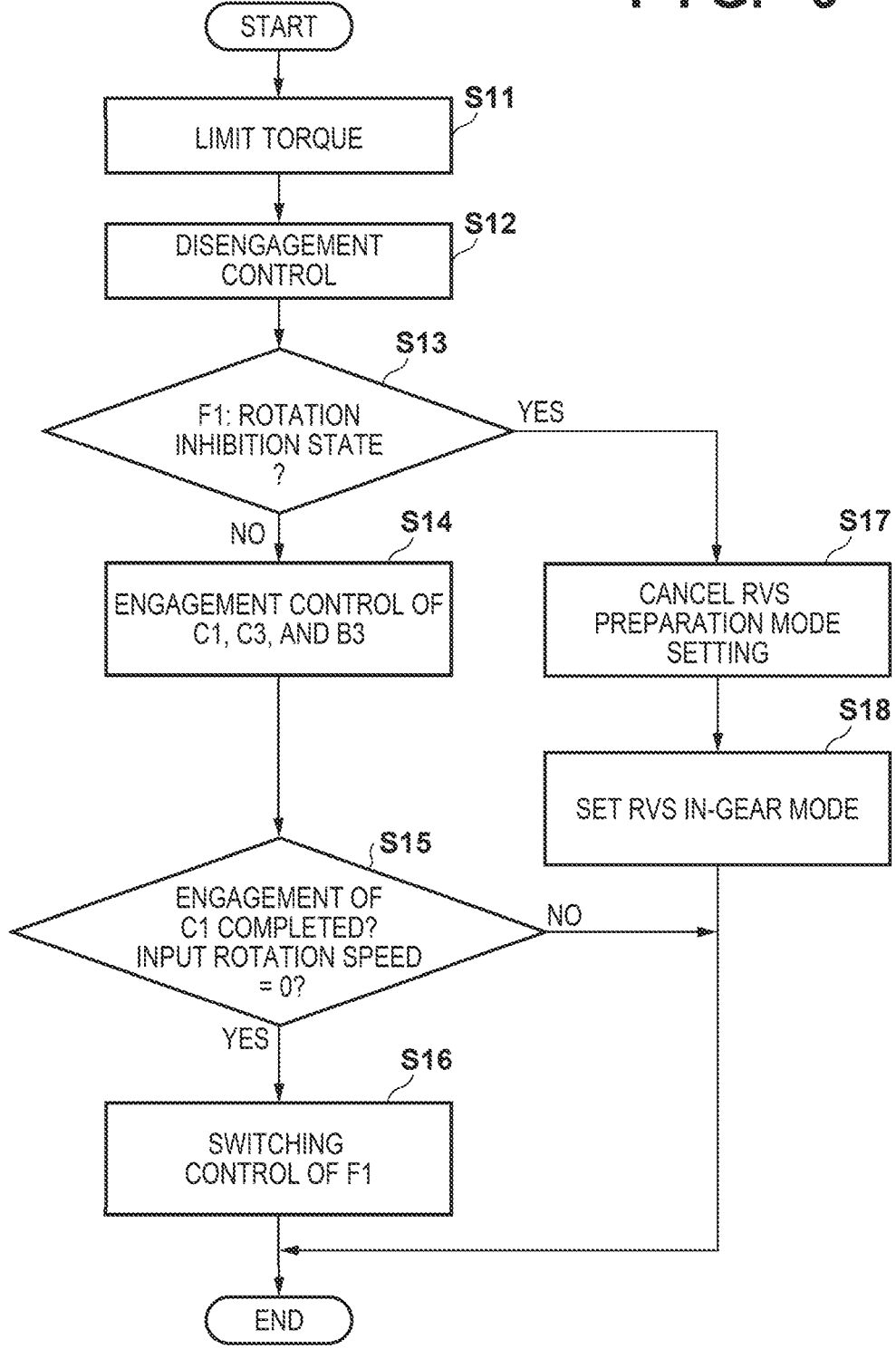
FIG. 9 is a flowchart showing an example of processing of the control apparatus shown in FIG. 4A.

FIG. 9 will be referred to. FIG. 9 is a flowchart showing RVS preparation processing of step S7. In step S11, torque limitation of the driving source of the automatic transmission 1 is performed. For example, the output of the internal combustion engine EG is reduced within the range in which the necessary oil pressures of the engaging mechanisms and the like are ensured.

In step S12, engagement control for releasing the engaging mechanisms (for example, engaging mechanisms B1 and B2) in the engaging state is started, as described concerning step 1 shown in FIG. 5. As for release of the engaging mechanism B1, when the oil pressure supply control A is set, normal control shown in EX11 of FIG. 7 is performed. When the oil pressure supply control B is set, control shown in EX12 of FIG. 7 is performed to release the engaging mechanism B1 later than normal.

In step S13, it is determined whether switching of the brake F1 to the rotation inhibition state is completed. If YES in step S13, the process advances to step S17. Otherwise, the process advances to step S14.

In step S14, control to engage the engaging mechanisms C1, C3, and B3 starts, as described concerning step 2 shown in FIG. 5. When the oil pressure supply control A is set, control shown in EX1 or EX2 of FIG. 6 is performed. When the process of step S14 is repeated a plurality of times, the engagement is completed. When the oil pressure supply control B is set, control shown in EX3 of FIG. 6 is performed. When the process of step S14 is performed once or several times, the engagement is completed.

In step S15, it is determined whether engagement of the clutch C1 is completed, and the rotation speed of the input shaft 10 is 0. If all the conditions are met, the process advances to step S16. If not all the conditions are met, the processing of one unit ends.

In step S16, the state of the brake F1 is switched to the rotation inhibition state, as described concerning step 3 shown in FIG. 5. Since the switching is done in a state in which the difference between the rotation speed of the brake F1 on the side of the casing 12 and that on the side of the carrier Cr2 is 0, it is possible to prevent occurrence of unusual noise or vibration and avoid breakage of the brake F1.

In step S17, setting of the RVS preparation mode is canceled. In step S18, the RVS in-gear mode is set. With this setting, processing of releasing the engaging mechanisms C1 and B3 and engaging the engaging mechanism B2 is performed, as described concerning step 4 shown in FIG. 5, in another routine (for example, step S8 in FIG. 8). The processing thus ends.

<Switching from D Range to Non-Running Range>

When the gear range is switched from the D range to a non-running range (parking range or neutral range), there is a possibility that the R range is selected after that. Hence, if the brake F1 is in the one-way rotation permission state, it may be switched to the rotation inhibition state. However, there is also a possibility that the gear range is not changed to the R range but returned to the D range. Hence, switching to the rotation inhibition state is done when the vehicle speed is equal to or less than the threshold V, and the oil pressure supply control B is employed. Hence, if the possibility that the R range is selected is high, the brake F1 can be switched to the rotation inhibition state in advance. When the R range is selected, the reverse range can quickly be put in gear.

Figure 10:
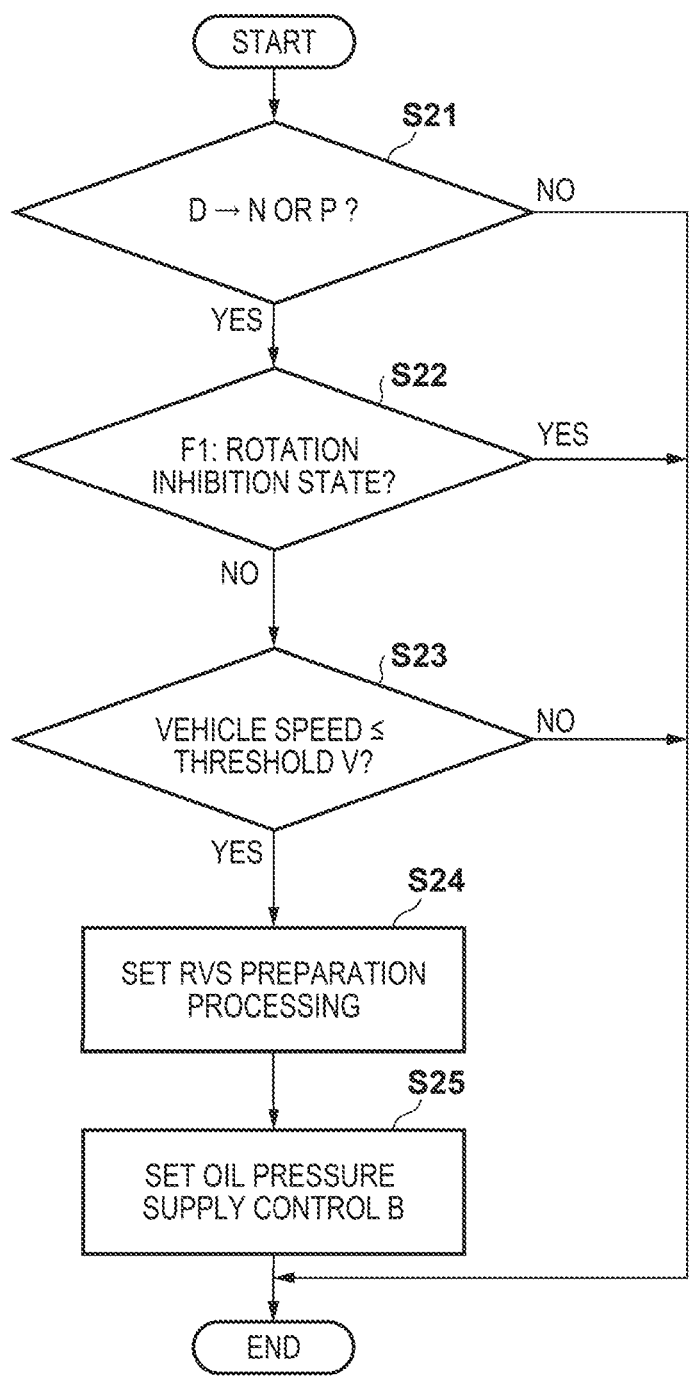
FIG. 10 is a flowchart showing an example of processing of the control apparatus shown in FIG. 4A.

FIG. 10 is a flowchart showing an example of processing executed by the processing unit 101 upon switching from the D range to a non-running range.

In step S21, it is determined whether the SP sensor 112 has detected that the driver has switched the shift range from the D range (for example, the first range) to a non-running range (N range or P range). If the switching is detected, the process advances to step S22. If the switching is not detected, the processing of one unit ends.

In step S22, it is determined whether the brake F1 is in the rotation inhibition state. If the brake F1 is not in the rotation inhibition state, the process advances to step S23. If the brake F1 is in the rotation inhibition state, the processing of one unit ends.

In step S23, it is determined whether the speed detection result of the vehicle speed sensor 114 is equal to or less than the threshold V. If the speed detection result is equal to or less than the threshold V, the process advances to step S24. If the speed detection result exceeds the threshold V, the processing of one unit ends.

In step S24, the RVS preparation mode is set as the control mode. In step S25, the oil pressure supply control B is set. Accordingly, the same processing as in FIG. 9 is executed by the oil pressure supply control B. However, RVS in-gear mode setting in step S18 is not performed, and the processing waits in a state in which the engaging mechanisms C1 to C3 and B1 to B3 are released (FIG. 2A). The processing thus ends.

Summary of Embodiment

1. A control apparatus (for example, 100) according to the embodiment is a control apparatus for an automatic transmission (for example, 1),
the automatic transmission including:
an input shaft (for example, 10) to which a driving force is input;
an output member (for example, 11);

a plurality of planetary gear mechanisms (for example, P1 to P4) configured to transmit the driving force input to the input shaft to the output member; and a plurality of engaging mechanisms (for example, C1 to C3, B1 to B3, F1) capable of establishing a plurality of gear ranges by switching a transmission path of the driving force in the plurality of planetary gear mechanisms, wherein the plurality of engaging mechanisms include:

a mechanical engaging mechanism (for example, F1) configured to function as a brake; and a plurality of hydraulic friction engaging mechanisms (for example, C1 to C3, B1 to B3), the mechanical engaging mechanism can be switched between a first state in which rotation of a predetermined rotational element (for example, Cr1, Cr2), out of a plurality of rotational elements included in the plurality of planetary gear mechanisms, is restricted only in one direction and a second state in which the rotation of the predetermined rotational element is restricted in both directions, the control apparatus comprising:

a detection unit (for example, 114) configured to detect a vehicle speed; and a control unit (for example, 101) configured to control the plurality of engaging mechanisms, wherein the control unit executes switching control to switch the mechanical engaging mechanism from the first state to the second state when a predetermined switching condition is met (for example, S7), in the switching control, after engagement control (for example, S14) for setting a plurality of hydraulic friction engaging mechanisms (for example, C1, C3, B3) selected from the plurality of hydraulic friction engaging mechanisms in an engaging state, the mechanical engaging mechanism is switched from the first state to the second state (for example, S16), and in the engagement control, if a speed detection result is not more than a threshold (for example, V), oil pressure supply control (for example, oil pressure supply control B) for completing the engagement in a time shorter that in a case in which the speed detection result exceeds the threshold is performed.

According to this arrangement, it is possible to suppress unusual noise or vibration when switching the mechanical engaging mechanism, and if unusual noise or vibration is expected to be small, shorten the switching time of the mechanical engaging mechanism.

2. The control apparatus according to the embodiment further comprises a detection unit (for example, 112) configured to detect a shift position, wherein the plurality of gear ranges include:

at least one forward range (for example, 1st to 10th) that can be established in the first state of the mechanical engaging mechanism; and a reverse range (for example, RVS) to be established in the second state of the mechanical engaging mechanism, and the predetermined switching condition includes at least detection of switching of the shift position to the reverse range.

According to this arrangement, it is possible to suppress unusual noise or vibration when switching the gear range to the reverse range, and if unusual noise or vibration is expected to be small, shorten the switching time of the mechanical engaging mechanism.

3. In the control apparatus according to the embodiment, in a case in which the shift position is switched to a non-running range, and the speed detection result is not more than the threshold as well, the switching control is performed (for example, S24), and in the engagement control in this switching control, the oil pressure supply control for completing the engagement in the short time is performed (for example, S25).

According to this arrangement, it is possible to switch the mechanical engaging mechanism in advance to prepare for selection of the reverse range and also shorten the switching time.

4. In the control apparatus according to the embodiment, the plurality of hydraulic friction engaging mechanisms selected in the engagement control are hydraulic friction engaging mechanisms selected so as to change a rotation speed of the predetermined rotational element (for example, Cr1, Cr2) to 0 by engagement.

According to this arrangement, it is possible to suppress unusual noise or vibration caused by switching of the mechanical engaging mechanism and also lower the probability of breakage of the mechanical engaging mechanism.

5. In the control apparatus according to the embodiment, the threshold has a value corresponding to a stop (for example, 0 km/h).

According to this arrangement, it is possible to make unusual noise or vibration small and switch the mechanical engaging mechanism in a short time.

6. In the control apparatus according to the embodiment, the control unit performs release control (for example, S12) to switch a predetermined hydraulic friction engaging mechanism, out of the plurality of hydraulic friction engaging mechanisms, that functions as a brake from the engaging state to a disengaging state when the predetermined switching condition is met, one (for example, P1) of the plurality of planetary gear mechanisms is a planetary gear mechanism including a rotational element (for example, Cr1) connected to the predetermined rotational element and a rotational element (for example, S1) disconnected from a casing (for example, 12) by the predetermined hydraulic friction engaging mechanism, and in the release control, if a speed detection result is not more than the threshold, disengagement of the predetermined hydraulic friction engaging mechanism is delayed as compared to a case in which the speed detection result exceeds the threshold (for example, EX12).

According to this arrangement, it is possible to easily maintain the predetermined rotational element in a standstill state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control apparatus for an automatic transmission, the automatic transmission including:

an input shaft to which a driving force is input;

an output member;

a plurality of planetary gear mechanisms configured to transmit the driving force input to the input shaft to the output member; and a plurality of engaging mechanisms capable of establishing a plurality of gear ranges by switching a transmission path of the driving force in the plurality of planetary gear mechanisms, wherein the plurality of engaging mechanisms include:

a mechanical engaging mechanism configured to function as a brake; and a plurality of hydraulic friction engaging mechanisms, the mechanical engaging mechanism can be switched between a first state in which rotation of a predetermined rotational element, out of a plurality of rotational elements included in the plurality of planetary gear mechanisms, is restricted only in one direction and a second state in which the rotation of the predetermined rotational element is restricted in both directions, the control apparatus comprising:

a detection unit configured to detect a vehicle speed; and a control unit configured to control the plurality of engaging mechanisms, wherein the control unit executes switching control to switch the mechanical engaging mechanism from the first state to the second state when a predetermined switching condition is met, in the switching control, after engagement control for setting a plurality of hydraulic friction engaging mechanisms selected from the plurality of hydraulic friction engaging mechanisms in an engaging state, the mechanical engaging mechanism is switched from the first state to the second state, and in the engagement control, if a speed detection result is not more than a threshold, oil pressure supply control for completing the engagement in a time shorter that in a case in which the speed detection result exceeds the threshold is performed.

2. The apparatus according to claim 1, further comprising a detection unit configured to detect a shift position, wherein the plurality of gear ranges include:

at least one forward range that can be established in the first state of the mechanical engaging mechanism; and a reverse range to be established in the second state of the mechanical engaging mechanism, and the predetermined switching condition includes at least detection of switching of the shift position to the reverse range.

3. The apparatus according to claim 2, wherein in a case in which the shift position is switched to a non-running range, and the speed detection result is not more than the threshold as well, the switching control is performed, and in the engagement control in this switching control, the oil pressure supply control for completing the engagement in the short time is performed.

4. The apparatus according to claim 1, wherein the plurality of hydraulic friction engaging mechanisms selected in the engagement control are hydraulic friction engaging mechanisms selected so as to change a rotation speed of the predetermined rotational element to 0 by engagement.

5. The apparatus according to claim 1, wherein the threshold has a value corresponding to a stop.

6. The apparatus according to claim 1, wherein the control unit performs release control to switch a predetermined hydraulic friction engaging mechanism, out of the plurality of hydraulic friction engaging mechanisms, that functions as a brake from the engaging state to a disengaging state when the predetermined switching condition is met, one of the plurality of planetary gear mechanisms is a planetary gear mechanism including a rotational element connected to the predetermined rotational element and a rotational element disconnected from a casing by the predetermined hydraulic friction engaging mechanism, and in the release control, if a speed detection result is not more than the threshold, disengagement of the predetermined hydraulic friction engaging mechanism is delayed as compared to a case in which the speed detection result exceeds the threshold.

* * * * *